United States Patent [19]
Mason et al.

[11] Patent Number: 6,158,004
[45] Date of Patent: *Dec. 5, 2000

[54] INFORMATION STORAGE MEDIUM AND SECURITY METHOD THEREOF

[75] Inventors: Colin Mason; Takayuki Shinohara, both of Tokyo, Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/978,449

[22] Filed: Nov. 25, 1997

[30] Foreign Application Priority Data

Oct. 6, 1997 [JP] Japan ..................... 9-152687

[51] Int. Cl.[7] ..................... G06F 11/30
[52] U.S. Cl. ............... 713/200; 705/51; 705/57; 705/58; 713/162; 713/165; 713/168; 713/166; 380/287; 380/28
[58] Field of Search ............ 713/200, 20, 162, 713/165, 166; 380/4, 3, 287, 28; 705/51, 57, 58

[56] References Cited

U.S. PATENT DOCUMENTS

| | | | |
|---|---|---|---|
| 5,068,894 | 11/1991 | Hoppe | 380/23 |
| 5,124,117 | 6/1992 | Tatebayashi et al. | 380/21 |
| 5,204,663 | 4/1993 | Lee | 340/825.34 |
| 5,623,637 | 4/1997 | Jones et al. | 395/491 |

FOREIGN PATENT DOCUMENTS

| | | |
|---|---|---|
| 0471538 | 2/1992 | European Pat. Off. . |
| 7-25436 | 5/1995 | Japan . |
| 9600942 | 1/1996 | WIPO . |

*Primary Examiner*—Tod R Swann
*Assistant Examiner*—Paul E. Callahan
*Attorney, Agent, or Firm*—Leydig, Voit & Mayer, Ltd.

[57] ABSTRACT

A security system for an information storage medium is so structured that only file data including secret individual information is encrypted by an encryptor/decryptor circuit. Known file management data is written in a memory device in plain text. This encrypting device prevents any third person from reading the secret information without unnecessary encryption of non-secret data to realize an enhanced security function.

3 Claims, 6 Drawing Sheets

INFORMATION STORAGE MEDIUM AND SECURITY METHOD THEREOF

BACKGROUND OF THE INVENTION

1. Field of the Invention

The present invention relates to an information storage medium equipped with a memory device such as a flash memory, EEPROM or magnetic disk memory used as an external storage medium in an information processor, and also relates to a security method thereof.

2. Description of the Prior Art

Regarding an external storage medium for use in a battery-powered portable information terminals, there are many types of information storage media including various IC cards, particularly a category termed flash ATA-PC card (hereinafter referred to simply as PC card). FIG. 7 is a functional block diagram of an information storage medium representing a conventional flash ATA-PC card. In this diagram, there are shown an information storage medium 1e; a host apparatus 2; a central controller 3e; a memory device 4 such as a flash memory, EEPROM or magnetic disk memory; a host interface circuit 5; a central processing unit (CPU) such as a microprocessor (MPU); a sector buffer 7; a bus control circuit 8; an ECC (error correction code) circuit 11; and a memory control circuit 12.

The central controller 3e consists of the host interface circuit 5, the CPU 6, the sector buffer 7, the bus control circuit 8, the ECC circuit 11 and the memory control circuit 12, all of which can be mounted on a sing IC (integrated circuit) chip. The ECC circuit 11 has a function of correcting, as well as detecting, up to a certain number of bit errors.

Next, the operation will be described.

First in a mode to write data in such information storage medium 1e, the host apparatus 2 writes new file data in a data area of the information storage medium 1e after writing, at predetermined logical addresses by an OS which handles media with a disk type architecture, directory entry information composed of file name, size, generation date and so forth, and also FAT (file allocation tab) information indicative of a logical storage location for the file data. At this time, the data stored temporarily in the sector buffer 7 via the host interface circuit 5 is written, in the form of un-encrypted data (i.e., in a form which is not encrypted to enhance security), by the central controller 3e in a predetermined area (header area, sector data area or ECC area) in accordance with the logical address value specified by the host apparatus 2.

And in a read mode, the CPU 6 sequentially reads out the stored data from the memory device 4 via the sector buffer 7 while communicating with the host apparatus 2 via the host interface circuit 5. Since the stored data is in the form of un-encrypted data in this case, no manipulation is executed for data conversion.

SUMMARY OF THE INVENTION

As the conventional information storage medium such as a PC card has the above structure, its general-purpose usability is high with adequate suitability for reading and writing data by driver software originally designed for hard disk use. On the other hand, however, there arises a problem that confidential information or secret information stored in the information storage medium 1e can be easily read by those with no right to do so. In order to solve this problem, a measure may be contrived to ensure a security function by encrypting the entire information stored in the information storage medium 1e, but in this case exclusive driver software equipped with encrypting and decrypting functions is required for access to the information storage medium, whereby the general-purpose usability thereof is impaired.

The present invention has been accomplished for solving the problems mentioned above, and its object resides in providing an improved information storage medium such as a PC card with a security function which is capable of sectively encrypting only particular data (file) which a user desires be unreadable by other people and then storing the encrypted data in a memory device such as a flash memory, while still maintaining sufficiently high general-purpose usability required for the information storage medium.

According to a first aspect of the present invention, there is provided an information storage medium comprising a central processor, an interface circuit for exchanging data with a host apparatus, a memory device for storing data, and a calculator circuit for selectively encrypting the data from the host apparatus or decrypting the stored data.

With the above structure, it becomes possible to selectively encrypt and decrypt the data from the host apparatus in conformity with the secrecy of the data, so that exact security can be achieved with respect to any valuable data stored therein, and still the required high general-purpose usability is maintained properly in the information storage medium.

According to a second aspect of the invention, the calculator circuit selectively encrypts the data from the host apparatus file by file, that is, every file unit.

Therefore, an effect of ensuring security is attainable by execution of an encrypting process in conformity with the kind and use of file management data or high-secrecy file data.

According to a third aspect of the invention, a selector means is further included to enab or disable the calculator circuit in response to a command from the host apparatus.

Therefore, it becomes possible to perform such setting as to prevent reading of any secret data by an ordinary read command from the host apparatus, hence attaining an effect of realizing a high-security data storage system.

According to a fourth aspect of the invention, there is provided an information storage medium comprising a central processor; an interface circuit for exchanging data with a host apparatus; a memory device for storing data; a first calculator circuit for necessarily encrypting and decrypting the data in write and read modes respectively; and a second calculator circuit for optionally encrypting and decrypting the data in write and read modes respectively.

With this structure, the first calculator circuit operates in response to an ordinary command from the host apparatus and encrypts or decrypts the data, while the second calculator circuit operates in response to only an extension command alone and then executes other encrypting or decrypting, whereby the first and second calculator circuits can be rendered in common use to consequently achieve an effect that a security function adapted for execution of selective encrypting and decrypting processes can be additionally realized with a smaller-scale circuit configuration.

According to a fifth aspect of the invention, the encrypting and decrypting processes executed by the second calculator circuit are effective until renewal or resetting of the circuit.

In this case, a remarkable effect is attainable in that high security is realized in a simplified system.

According to a sixth aspect of the invention, there is provided an information storage medium security method which encrypts data to be written in a sector data area but does not encrypt data to be written in a file management data area.

In this method, enhanced security can be ensured with regard to any particular data such as individual information of high secrecy.

According to a seventh aspect of the invention, a process of encrypting or decrypting data is executed in response to a command from the host apparatus.

Therefore, it becomes possible to realize a high-security data storage system wherein the written data is not readable by an ordinary read sector command from the host apparatus.

According to an eighth aspect of the invention, normal encrypting and decrypting processes are executed for ordinary input data, while different encrypting and decrypting processes are executed for other data input from any special key.

In this case, common means can be employed for encrypting and decrypting both of the ordinary input data and the other input data from any special key, whereby the entire apparatus is reducible in scale.

According to a ninth aspect of the invention, input of data from the special key to the information storage medium is executed either directly or in response to a command from the host apparatus.

Therefore, required security can be ensured in view of both the host apparatus and the information storage medium.

And according to a tenth aspect of the invention, input of data from the special key is effective until input of new data from the key or until the apparatus is reset or switched off.

In this case, there is attained an effect that secrecy can be kept by setting simple security software.

DETAILED DESCRIPTION OF THE PREFERRED EMBODIMENTS

Hereinafter some preferred embodiments of the present invention will be described in detail with reference to the accompanying drawings.

Embodiment 1

Figure 1:
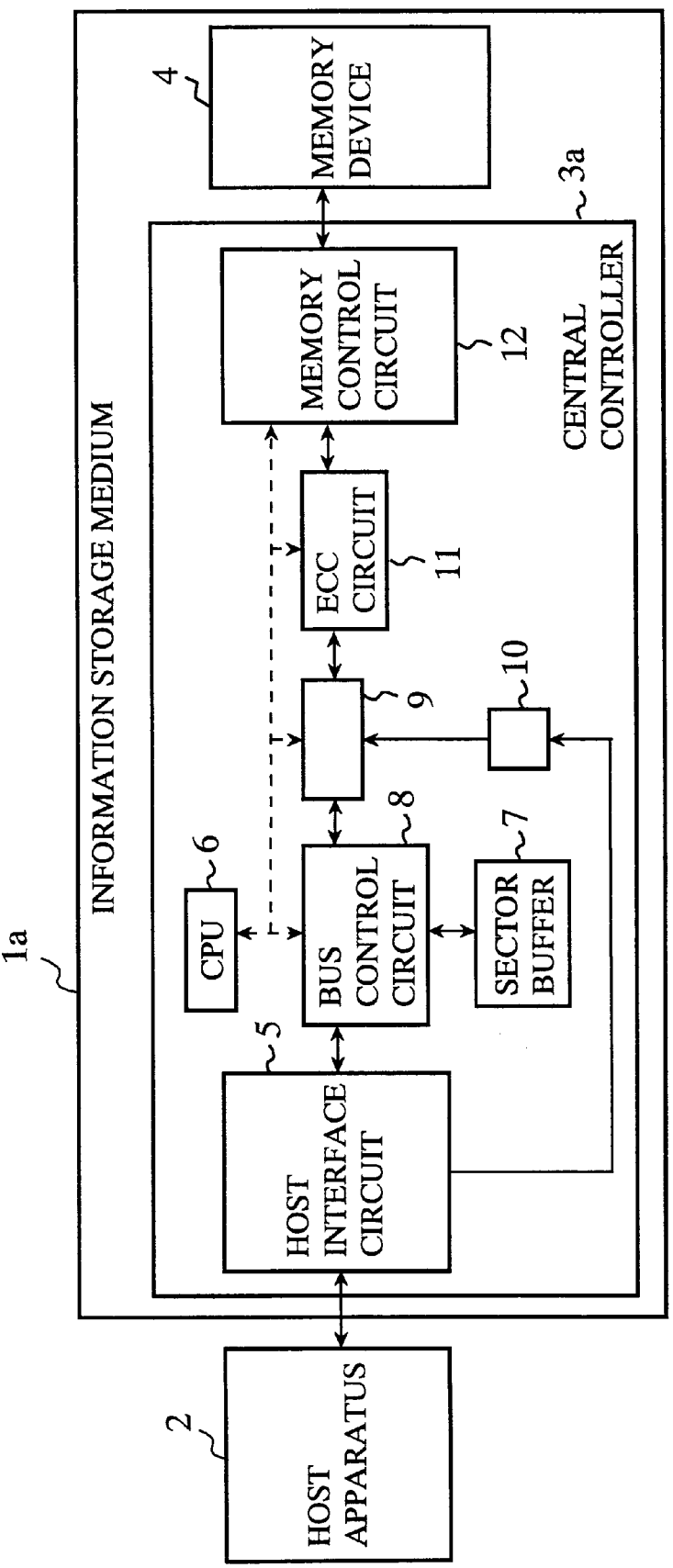
FIG. 1 is a functional block diagram of an information storage medium in Embodiment 1 of the present invention.

FIG. 1 is a functional block diagram of an information storage medium such as a flash ATA-PC card in Embodiment 1 according to the present invention. In the drawing, there are shown an information storage medium 1a; a host apparatus 2; a central controller 3a; a memory device 4 such as a flash memory, EEPROM or magnetic disk memory; a host interface circuit 5; a CPU (central processing unit) 6 such as a microprocessor (MPU); a sector buffer 7; a bus control circuit 8; an encryption/decryption circuit 9 (first calculator circuit); an encryption/decryption key setting circuit 10 (second calculator circuit); an ECC (error correction code) circuit 11; and a memory control circuit 12.

The central controller 3a consists of the above host interface circuit 5, CPU 6, sector buffer 7, bus control circuit 8, encryption/decryption circuit 9, encryption/decryption key setting circuit 10, ECC circuit 11 and memory control circuit 12, all of which are present in a single integrated circuit (IC) chip.

Figure 2:
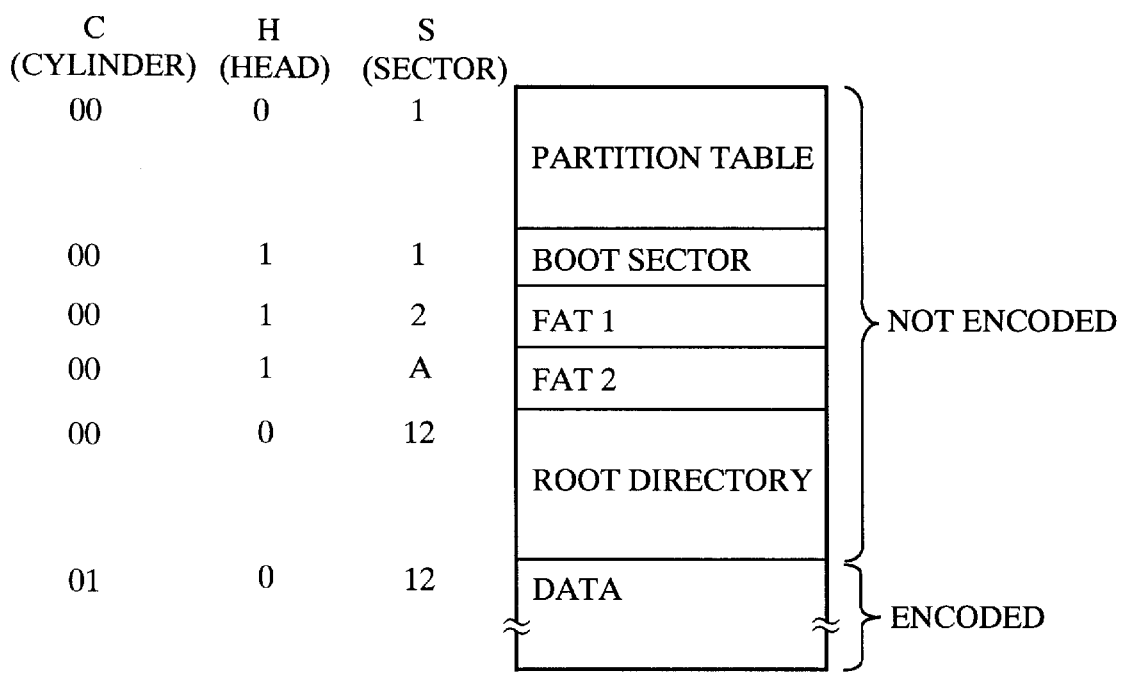
FIG. 2 shows a data structure obtained after "OS" formatting of the information storage medium in Embodiment 1 of the invention.

FIG. 2 shows an internal data structure of an information storage medium 1 such as a PC card formatted by a general disk operating system such as an "OS" which handles media with a disk type architecture. Thus, in accordance with the capacity, an OS executes formatting of the information storage medium 1 by writing partitioning information, boot information, and file management information (FAT and directory entry) in predetermined areas. Out of the above information, the contents of the file management information (FAT (File Allocation Table) and directory entry) are updated at each time of writing the file data.

Figure 3:
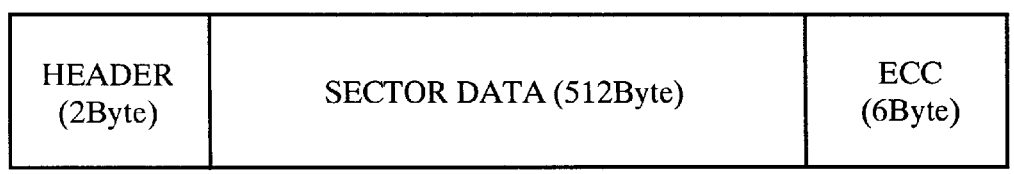
FIG. 3 shows a data structure of the information storage medium in Embodiment 1 of the invention.

FIG. 3 shows the structure of sector data stored in the memory device 4 such as a flash memory in the information storage medium 1. Generally, a logical sector number assigned to the sector data is written in the header area and is used as reference ID information in a read mode. User data to be written is stored in the sector data area, and ECC (Error Correction Code) data for the header information and the sector data is stored in the ECC area.

The operation will be described below.

First an explanation will be given on how data is written. In FIG. 1, when the host apparatus 2 writes new file data in the information storage medium 1a, there are written, in the disk operating system on the host apparatus 2, both the directory entry information composed of file name, size and generation date, and FAT (File Allocation Table) indicative of a logical storage location of the file data, at predetermined logical addresses, and thereafter the file data is written in the data area.

Meanwhile in the central controller 3a, a determination is made, on the basis of the logical address value specified by the host apparatus 2, as to whether the data to be written is file management data or file data. And if the result of such determination signifies file management data, the encryption/decryption circuit 9 is not actuated, and the data is stored in the memory device 4 without being processed. However, when the result of the above determination signifies file data, the encryption/decryption circuit 9 is actuated to execute an encrypting calculation using of key information preset in the encryption/decryption key setting circuit 10, whereby the encrypted data is written at a predetermined address of the memory device 4 via the memory control circuit 12. The above decision and command are executed by the CPU 6 through a broken line shown in FIG. 1.

Next in a mode to read out the data from the information storage medium 1a, the operation is performed in accordance with a procedure reverse to the foregoing one. That is, a determination is conducted, on the basis of the logical address value specified by the host apparatus 2, as to whether the data read out from the memory device 4 is file management data or file data. Then the encryption/decryption circuit 9 is selectively actuated in such a manner as to decrypt only the latter data while not decrypting the former data, and thereafter a decrypting calculation is executed in response to the key information obtained from the encryption/decryption key setting circuit 10, whereby merely the file data alone is decrypted and read out to the host apparatus 2.

Thus, according to Embodiment 1, the encryption/decryption circuit 9 encrypts only the file data alone while writing the known file management data in the form of un-encrypted data, hence achieving a remarkable effect that such encrypted data is decrypted with difficulty by any third person to consequently ensure an enhanced security function.

Embodiment 2

Figure 4:
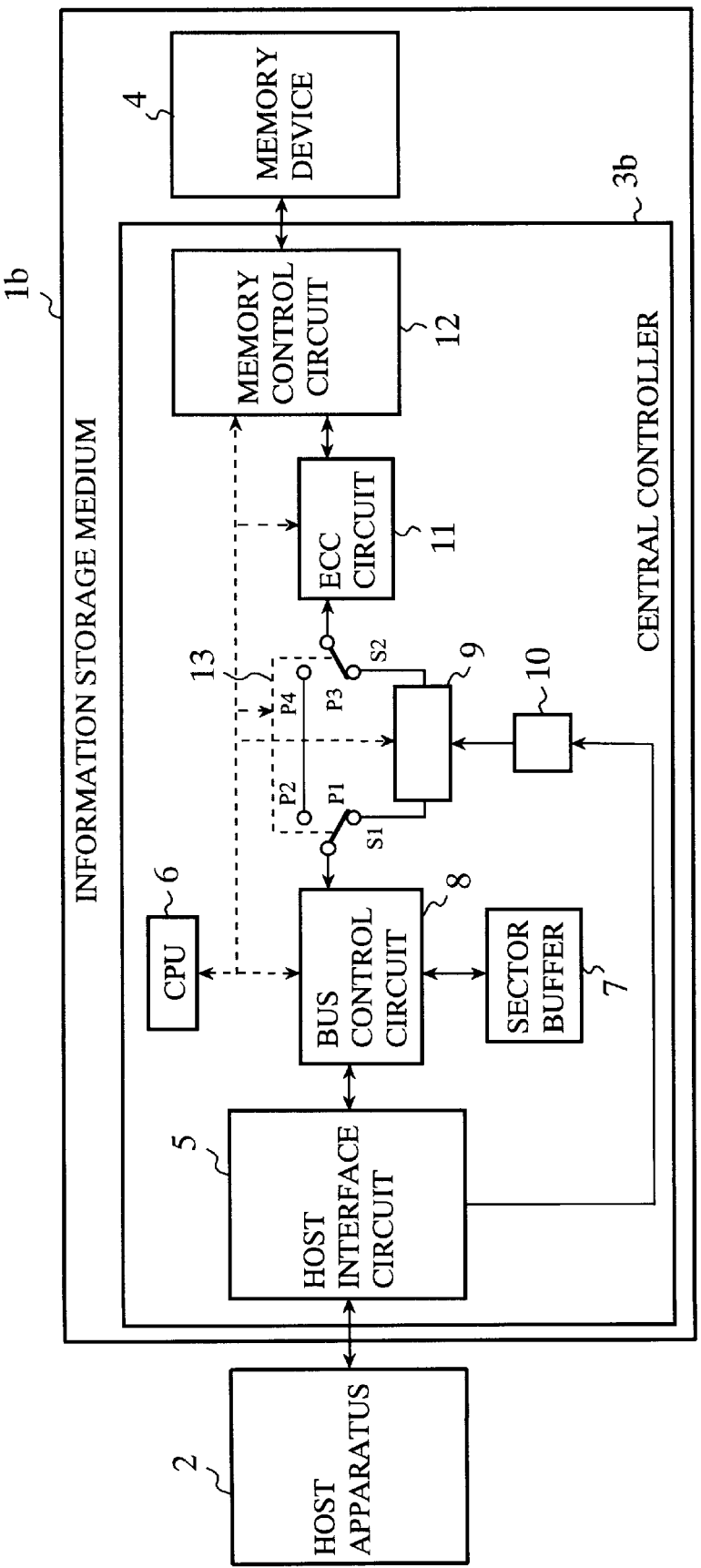
FIG. 4 is a function block diagram of an information storage medium in Embodiment 2 of the invention.

FIG. 4 is a functional block diagram of an information storage medium such as a flash ATA-PC card in Embodiment 2 of the present invention. In this diagram, there are shown an information storage medium 1b, a central controller 3b, a data transfer bus switching circuit 13 as a selection means, and switches S1 and S2. Since the other structure is the same as that of Embodiment 1 as described above, like components are denoted by like reference numerals, and a repeated explanation thereof is omitted here. The data transfer bus switching circuit 13 is that the switches S1 and S2 are connected to P1 and P3 respectively at the time of enabling the encryption/decryption circuit 9, or to P2 and P4 respectively at the time of disabling the circuit 9.

In Embodiment 2, execution of the encrypting process is selectable per file in response to an extension command. For the purpose of realizing selectable execution of the encrypting process per file, three extension commands (1) to (3) are defined as follows:

(1) Encryption Key Load Command

A command for loading encryption/decryption key data in the encryption/decryption circuit 9.

(2) Encryption-write Sector Command

A command for writing in the memory device 4 the data encrypted by the key data loaded from the host apparatus 2.

(3) Decryption-read Sector Command

A command for decrypting and reading the data encrypted by the key data loaded from the host apparatus 2.

This embodiment is designed so that, upon issuing of each encryption-write sector command or decryption-read sector command, the driver software in the host apparatus 2 requests, at each time, input of encryption data to be set in response to an encryption key command. Therefore, at the time of executing such encryption-write or decryption-read command, a specific encryption or decryption key relevant to the data (file) is input in combination therewith, so that it becomes possible to realize a high-security data storage system which prevents any other person from reading the data by the use of an ordinary read sector command.

Hereinafter an explanation will be given of a method of realizing such selective encrypting and decrypting processes per file. In FIG. 4, the data transfer bus switching circuit 13 connects the switches S1 and S2 to P1 and P3 respectively only at the time of executing the encryption-write command or decryption-read command from the host apparatus 2 to thereby validate the encryption/decryption circuit, or connects the switches S1 and S2 to P2 and P4 respectively at the time of executing an ordinary write/read sector command to thereby invalidate the encryption/decryption circuit, hence carrying out selective switching of the data transfer routes in the circuit.

Thus, according to Embodiment 2, the encryption/decryption circuit is enabled only at the time of issue of any extension command (1) to (3) from the host apparatus, whereby an encrypting process per file is rendered possible.

Consequently, there is achieved an effect that realizes a high-security data storage system which inputs a specific encryption/decryption key relevant to the file data in combination to thereby prevent any other person from reading the data by the use of an ordinary read sector command.

Embodiment 3

Figure 5:
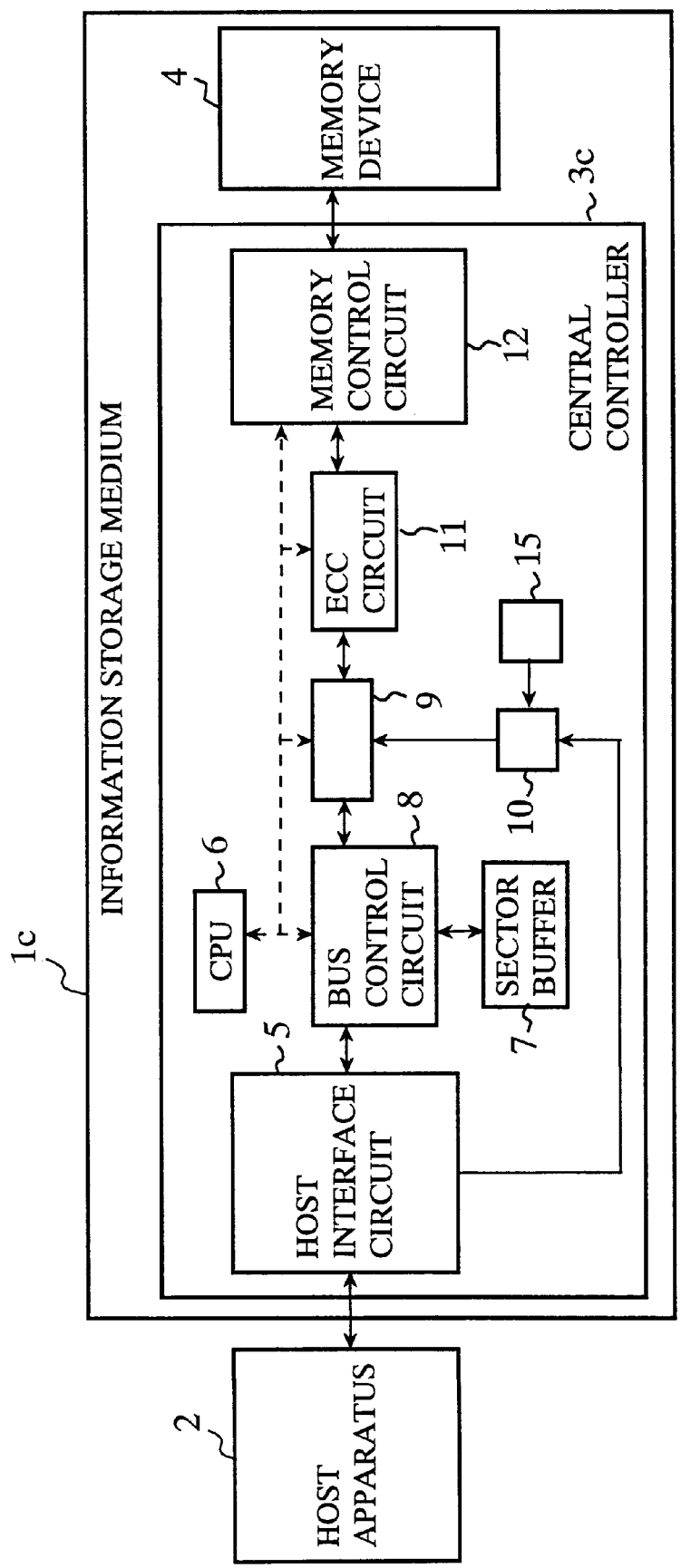
FIG. 5 is a functional block diagram of an information storage medium in Embodiment 3 of the invention.

FIG. 5 is a functional block diagram of an information storage medium such as a flash ATA-PC card in Embodiment 3 of the present invention. In this diagram, there are shown an information storage medium 1c, a central controller 3c, and a default key input unit 15. Since the other structure is the same as that of Embodiment 1 already mentioned, like components are denoted by like reference numerals, and a repeated explanation thereof is omitted here.

Next, its operation will be described below.

Entire file data to be stored in the information storage medium 1 such as a PC card is encrypted. More specifically, at the time of execution of an ordinary write/read sector command, the file data is encrypted or decrypted in response to default key data supplied from the default key input unit 15 to the encryption/decryption key setting circuit 10. Meanwhile, only at the time of execution of an encryption-write or decryption-read command which is an extension command, the specific key data set by the encryption/decryption key load command executed in combination is supplied from the encryption/decryption key setting circuit 10 to the encryption/decryption circuit 9, whereby encrypting or decrypting of the data is executed.

Thus, according to Embodiment 3, the encryption/decryption circuit is enabled in response to the special key data only at the time of executing an extension command, while this circuit is enabled in response to the default key data at the time of executing an ordinary write/read sector command, whereby the encryption/decryption circuit 9 is rendered usable in common to consequently achieve an effect that ensures an enhanced security function in selective encrypting and decrypting per file with a reduced circuit scale.

Figure 6:
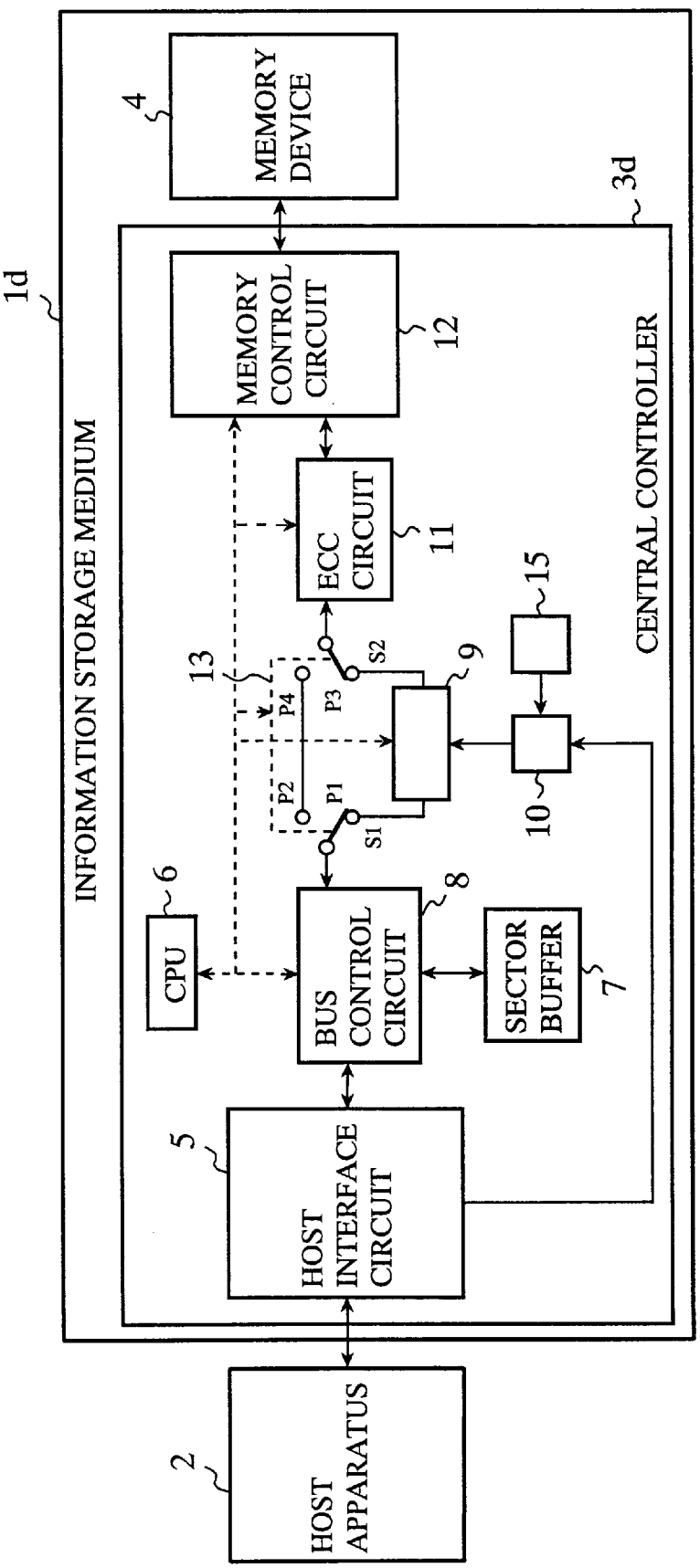
FIG. 6 is a functional block diagram of an information storage medium representing a modification of Embodiment 3 of the invention.
Figure 7:
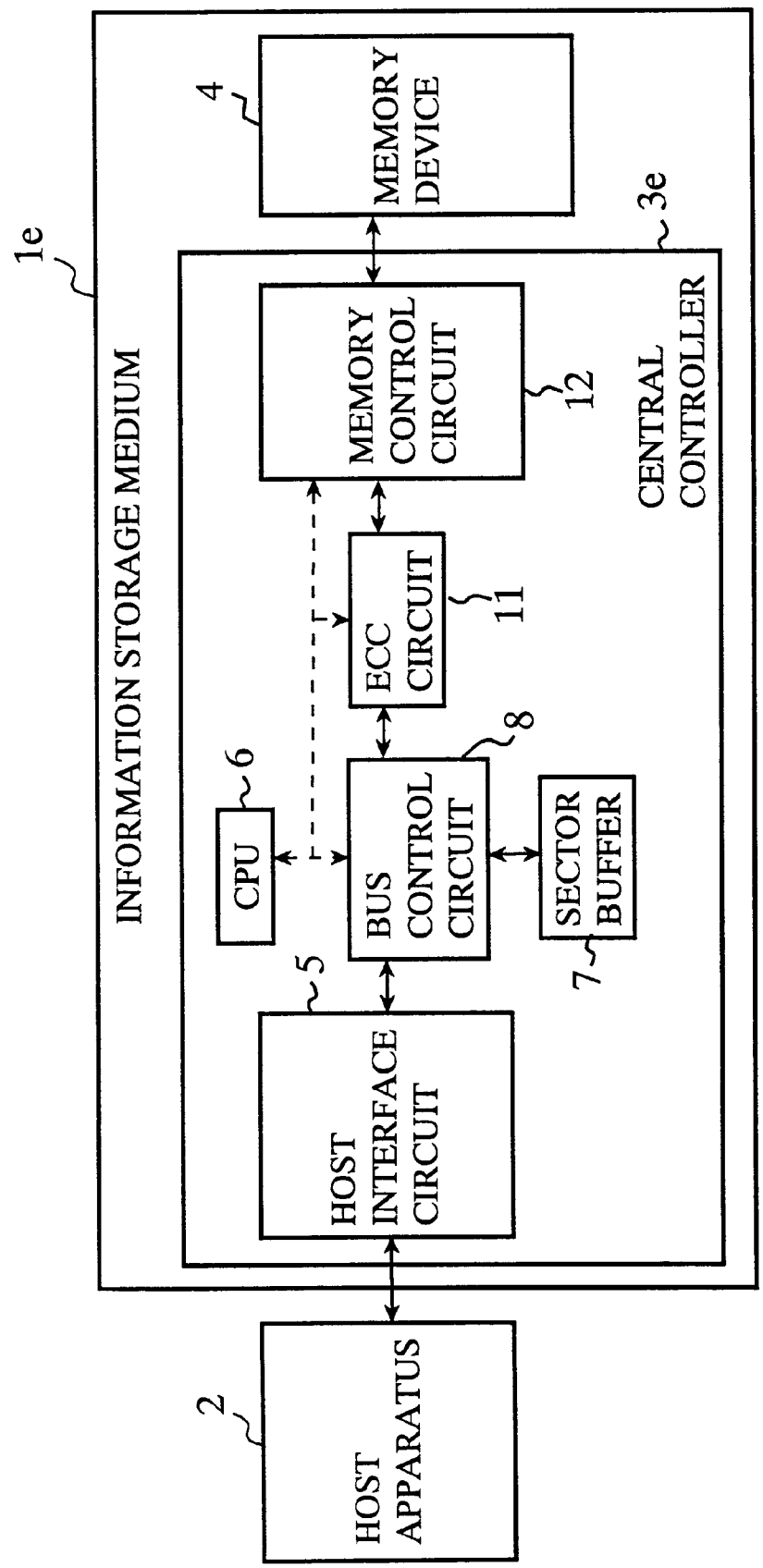
FIG. 7 is a functional block diagram of a conventional information storage medium according to the prior art.

There is contrived a modification thereof where the default key input unit 15 is applied to Embodiment 2, as represented by an information storage medium 1d of FIG. 6. This modification is so designed that, in addition to the aforementioned constitution where the encryption/decryption circuit is enabled in response to the special key data only at the time of executing an extension command while this circuit is enabled in response to the default key data at the time of executing an ordinary write/read sector command, a further advantage is attained in such a manner that the data transfer bus switching circuit 13 is actuated only at the time of issue of any extension command (1) to (3) from the host apparatus 2 to thereby enable the encryption/decryption circuit, so that an encrypting process per file is rendered possible. Consequently, there is achieved an effect that realizes a high-security data storage system which inputs a combination of the specific encryption/decryption key with the relevant file data to thereby prevent any other person from reading the data by the use of an ordinary read sector command.

Embodiment 4

In Embodiment 3 as mentioned above, an encrypting or decrypting process is carried out by setting specific key data relevant to each file in response to the encryption/decryption key load command issued in combination at each execution of the encryption-write or decryption-read sector command which is an extension command. Embodiment 4 represents another example where key data loaded by an encryption key load command is maintained to be effective until input of new key data or until the apparatus is reset or switched off, and an encrypting or decrypting process is carried out in response to such key data also at the time of executing an ordinary write/read sector command. In this embodiment, the loaded key data is deleted by an option command from a delete key, and the default key data is rendered effective.

Thus, according to Embodiment 4, the key data loaded by an encryption key load command is maintained to be effective until input of new key data or until the apparatus is reset or switched off, so that high security is ensured with a simplified construction.

What is claimed is:

1. An information storage medium comprising:

a central processor;

a memory device for storing data, said memory device including a plurality of addresses at which data may be stored;

an interface circuit for exchanging data with a host apparatus, the data including file data having logical addresses in a first range of logical addresses for storage in said memory device and file management data having logical addresses in a second range of logical addresses, different from the first range, for storage in said memory device;

a calculator circuit for encrypting the file data, but not the file management data, received from the host apparatus for storing in said memory device, and decrypting the file data stored in said memory device; and a bus switching circuit for validating said calculator circuit in response to a command received from the host apparatus, wherein the central processor distinguishes the file data from the file management data based upon the logical addresses of the data and said calculator circuit selectively encrypts the file data received from the host apparatus file-by-file.

2. A method for ensuring security of an information storage medium comprising:

distinguishing, in data received from a host apparatus, file data from file management data based upon logical addresses of the file data and the file management data, the file data having logical addresses in a first range of logical addresses for storage in a memory device of said information storage medium and file management data having logical addresses in a second range of logical addresses, different from the first range, for storage in the memory device;

encrypting the file data before writing the file data in a sector data area of the memory device but not encrypting the file management data and writing the file management data in a file management data area of the memory device, the sector data area having addresses in the first range and the management data area having addresses in the second range;

validating an encryption/decryption circuit through a bus switching circuit in response to a command from the host apparatus; and selectively encrypting the file data, in response to a command from the host apparatus, before writing the file data in the storage medium, and selectively decrypting the file data stored in the memory device, in response to a command from the host apparatus through the encryption/decryption circuit.

3. The method according to claim 2, including encrypting the file data received from the host apparatus file-by-file.

* * * * *

UNITED STATES PATENT AND TRADEMARK OFFICE
CERTIFICATE OF CORRECTION

PATENT NO.    : 6,158,004
DATED         : December 5, 2000
INVENTOR(S)   : MASON et al.

It is certified that an error appears in the above-identified patent and that said Letters Patent is hereby corrected as shown below:

[30] Foreign Application Priority Data "Oct. 6, 1997" should read --June 10, 1997--.

Signed and Sealed this

Eighth Day of May, 2001

*Attest:*

NICHOLAS P. GODICI

*Attesting Officer*   *Acting Director of the United States Patent and Trademark Office*